United States Patent
Freitag et al.

[19]

[11] Patent Number: 6,049,992
[45] Date of Patent: Apr. 18, 2000

[54] METHOD AND DEVICE FOR DIRECTED MOUNTING OF A MEASUREMENT STRIP

[75] Inventors: Hans-Joachim Freitag; Ludwig Boege, both of Jena; Robert Stelzner, Goettern, all of Germany

[73] Assignee: Johannes Heidenhain GmbH, Traunreut, Germany

[21] Appl. No.: 09/003,764

[22] Filed: Jan. 7, 1998

[30] Foreign Application Priority Data

Jan. 8, 1997 [DE] Germany .......................... 197 00 367

[51] Int. Cl.⁷ .................................................. G01B 21/02
[52] U.S. Cl. .................................................. 33/700; 33/706
[58] Field of Search ............................ 33/701, 702, 703, 33/704, 706, 700

[56] References Cited

U.S. PATENT DOCUMENTS

| | | |
|---|---|---|
| 4,259,144 | 3/1981 | Ballentine . |
| 4,492,033 | 1/1985 | Ichikawa ............................ 33/706 |
| 5,063,685 | 11/1991 | Morrison et al. . |
| 5,095,637 | 3/1992 | Kraus ............................... 33/702 |
| 5,182,867 | 2/1993 | Nelle ............................... 33/702 |
| 5,258,931 | 11/1993 | Hassler, Jr. ........................ 33/701 |

FOREIGN PATENT DOCUMENTS

| | | |
|---|---|---|
| 195 26 517 C1 | 12/1996 | Germany . |
| 195 26 518 C1 | 12/1996 | Germany . |
| 1670345 | 8/1991 | U.S.S.R. ............................ 33/702 |
| 2037431 | 7/1980 | United Kingdom .................. 33/702 |

OTHER PUBLICATIONS

Feinwerktechnik und Messtechnik, vol. 88, 7, pp. 333–338, Oct. 1980.
NC–Längenmesssysteme (NC Length Measuring Systems) from Heidenhein, Jun. 1996.

Primary Examiner—G. Bradley Bennett
Attorney, Agent, or Firm—McAulay Nissen Goldberg Kiel & Hand, LLP

[57] ABSTRACT

For directed mounting of a measurement strip in a length measuring system in which two bodies are arranged so as to be displaceable relative to one another, lateral mounting elements are fastened along the length of the measurement strip at a machine part against which the measurement strip is mounted before the measurement strip is fastened to this body.

12 Claims, 10 Drawing Sheets

METHOD AND DEVICE FOR DIRECTED MOUNTING OF A MEASUREMENT STRIP

BACKGROUND OF THE INVENTION a) Field of the Invention

The invention is directed to a method and a device for directed mounting of a measurement strip in a length measuring system by means of a mounting device.

b) Description of the Related Art

Scales made from steel strip are advantageously used not only in length measurement arrangements but also in angle measurement arrangements. These scales offer advantages over scales made from glass with respect to noncontact measurement, compact installation, and a robust, vibration-resistant construction.

In an embodiment form described in the periodical "Feinwerktechnik und Meβtechnik", Vol. 88, 7, pages 333–338, a groove is ground into a stainless steel scale body and the actual graduation substrate, which is a thin steel measurement strip, is cemented therein. In order to reinforce the gluing, weld points are placed at the start and at the end and at determined intervals at the side of the measurement strip for a rigid connection of the latter with the substrate body. This solution is advantageous in that the substrate body and the measurement strip can be produced separately and the measurement strip can accordingly be manufactured economically in any length. On the one hand, this solution is limited with respect to the length of the scale body that can be realized and also, on the other hand, is still very expensive and complicated to mount. In addition, the scale lengths are still limited because the base body can only be meaningfully manufactured and handled up to a length of several meters.

Another way of mounting measurement strips is described in DE 689 06 881 T2. In this case, a self-adhesive steel-strip scale is aligned with the guide sequence of the slide or carriage by means of an applicator and is glued onto the machine bed or to a base body. Although this type of measurement strip mounting provides a good correspondence between the measurement strip and scanning head over the entire measuring area, the basic accuracy that can be achieved in the measuring system is relatively poor because the inherent stability of the measurement strip is relatively low and the slightest mechanical stresses or differences in tension, which are unavoidable during the gluing process, lead to impaired measurement in the scale. Further, this method has the disadvantage that exchanging or disassembling the measurement strip is very involved and the measurement strip is generally no longer usable.

Another common type of fastening for thin measurement strips consists in that the measurement strip is received along its longitudinal extension in a groove. This is described in the company brochure "NC Längenmeβsysteme [NC Length Measuring Systems]"from Heidenhein, June 1996. As a rule, they are special receiving profiles made from extruded aluminum. However, these receiving profiles are limited with respect to the lengths that can be realized and, in addition, are also still very complicated to mount. The attainable spacing tolerances between the measurement strip and scanning head are also limited in this solution, since the flatness tolerance and position tolerance of the receiving groove in the extruded profile must also be taken into account in the flatness tolerance of the receiving surface.

OBJECT AND SUMMARY OF THE INVENTION

The primary object of the invention is to provide a method and a device for a directed mounting of a measurement strip in a length measuring system which facilitates mounting and servicing and also contributes to a reduction in errors.

In accordance with the invention, this object is met in a method of the generic type and in a device wherein the lateral contact elements along the length of the measurement strip are fastened to the first machine part against which the measurement strip is mounted before the measurement step is fastened to the first body.

A device for realizing the method is constructed in such a way that it receives and guides the contact elements at a distance from one another so that the measurement strip can be aligned.

This mounting device is fastened to the machine part carrying the measuring head. The position correspondence of the guide elements relative to the screw-on surface is selected in such a way that the graduation structure of the measurement strip to be received corresponds to the scanning position of the measurement head. Starting from one side, the mounting of the contact elements on the surface receiving the scale is carried out parallel to the movement direction and accordingly also exactly in the direction of measurement during the movement of the mounting device. The invention is explained more fully hereinafter in principle by way of example with reference to the drawings.

DESCRIPTION OF THE PREFERRED EMBODIMENTS

Figure 1A:
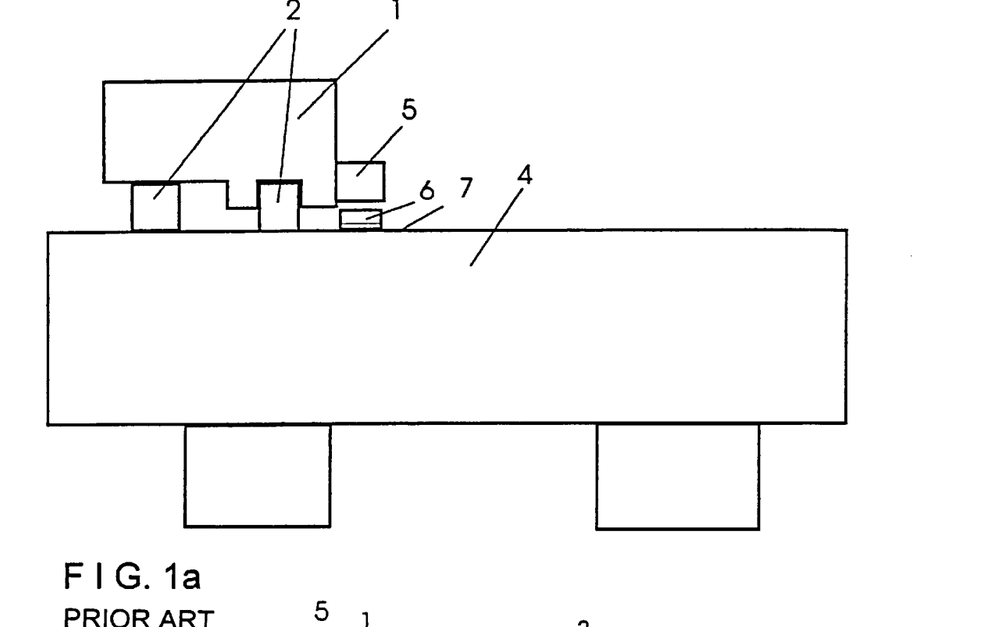
FIGS. 1a and 1b show schematic sectional views of a coordinate measuring machine with the measurement strip arranged according to the invention.
Figure 1B:
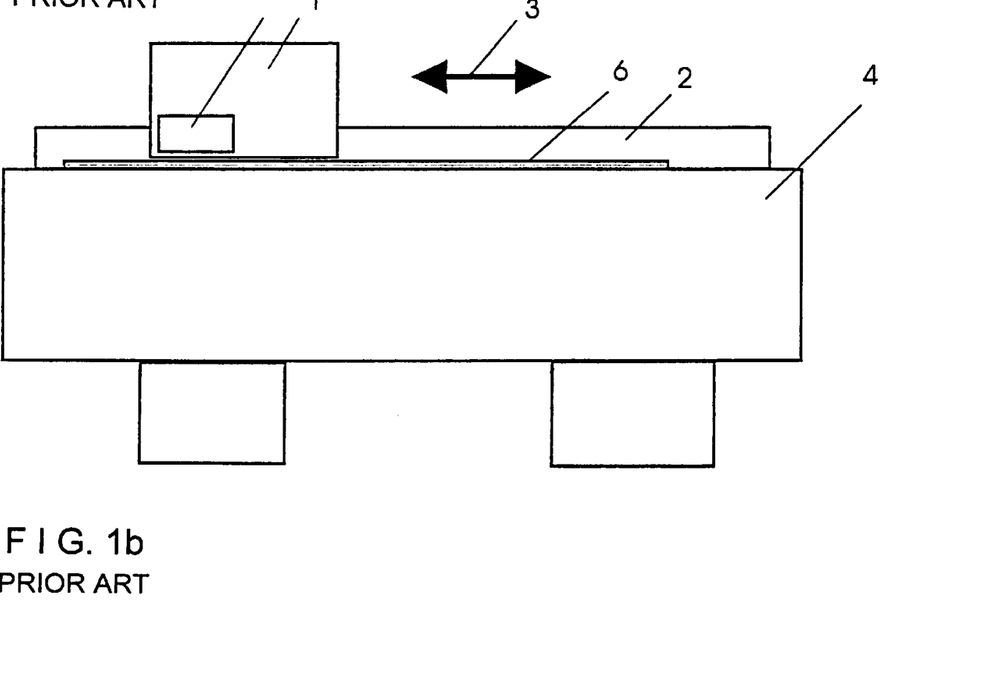

First, FIG. 1a and FIG. 1b show a section of a coordinate measuring machine with a measurement carriage (1) as a first machine part which is displaceable and movable along a linear guide (2). The movement direction (3) of the measurement carriage is given by the linear guide which is arranged at the machine base bed (4)—the second machine part—which serves at the same time to receive the objects to be measured. In such measuring machines, it is conventional that a measuring system comprising a scanning head (5) and a measurement scale specifically constructed as a measurement strip (6) is used for determining the measurement positions. In this respect, the scanning head is usually arranged at the shorter machine part having the shorter constructional length which, in the present example, is the measurement carriage. The measurement scale must be arranged on the longer part carrying the linear guide. For this purpose, a receiving surface (7) is provided at the machine base bed for the measurement strip holder.

For short measurement lengths, a measurement strip can be mounted manually against an auxiliary straight-edge which has been aligned with the guide path of the measurement carriage on the receiving surface and can accordingly be fastened to the receiving surface of the base bed parallel to the movement direction of the measurement carriage. However, in the case of longer measurement lengths, this mounting method is very involved and time-consuming.

Therefore, according to the invention, lateral mounting elements are mounted on the receiving surface for the measurement strip in a first step of the method by means of a mounting device which is arranged at the measurement carriage.

Figure 2A:
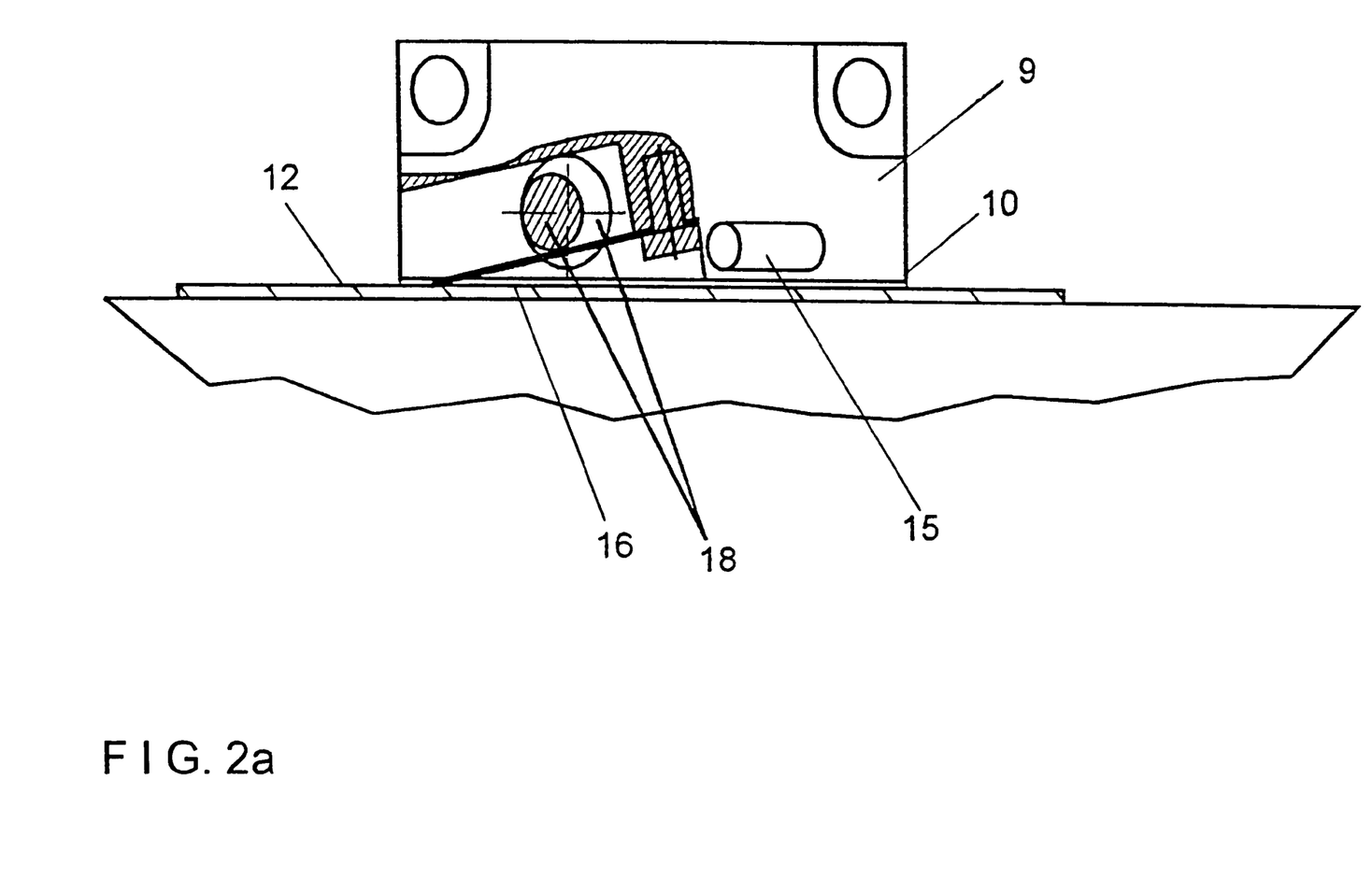
FIGS. 2a and 2b show schematic views of an embodiment example of the mounting device according to the invention.
Figure 2B:
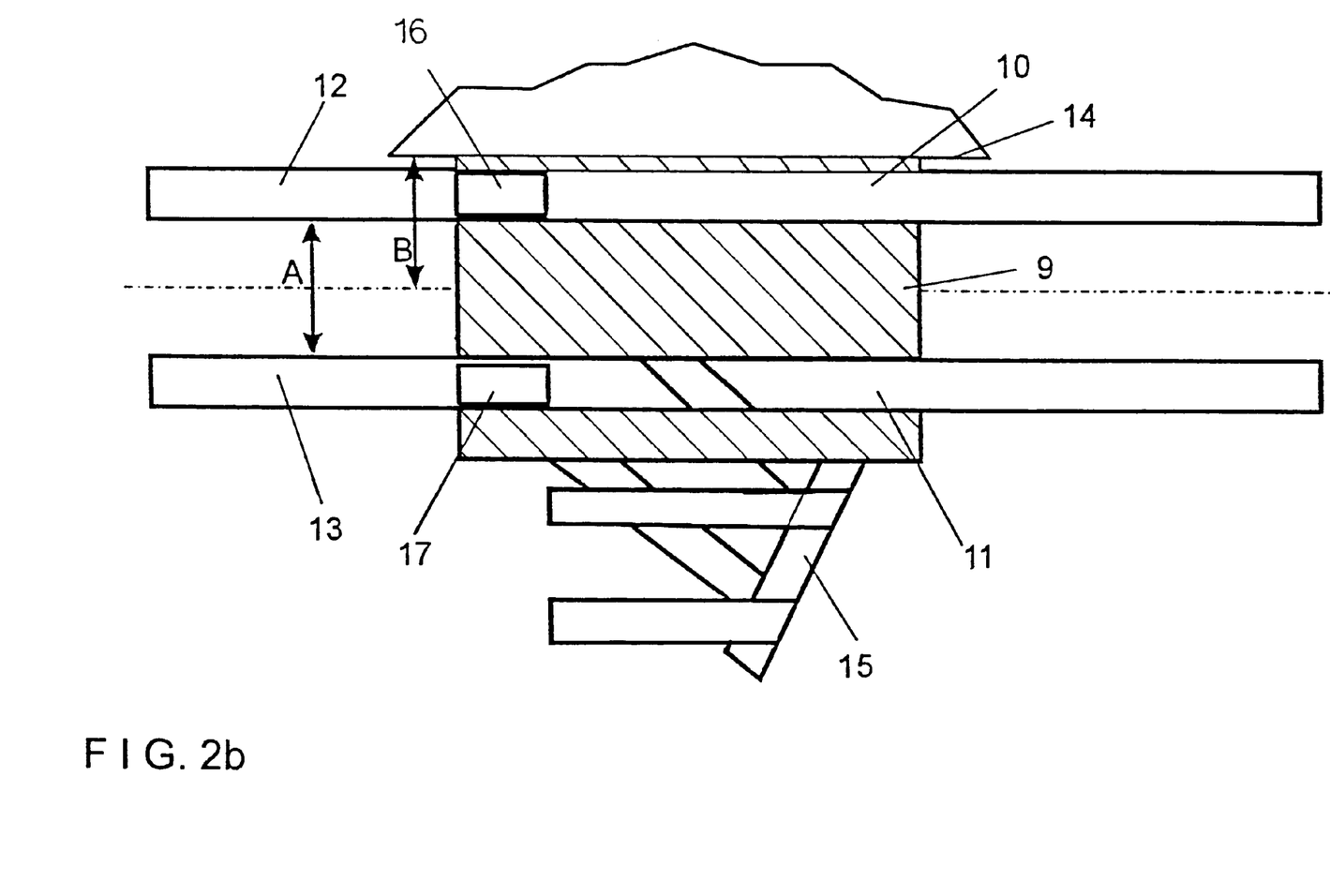

Mounting devices, according to the invention, for the mounting elements are shown in FIGS. 2a and 2b. This mounting device comprises a housing (9) whose principal dimensions with respect to length and height are preferably similar to those of the scanning head (5). The housing of the mounting device was advantageously designed such that it is compatible with the scanning head with respect to screwing on, so that it can be fastened to the measurement carriage by the same screw-on thread as that provided for the scanning head. The housing of the mounting device has two guide channels (10, 11) by means of which the mounting elements (12, 13) are oriented to the screw-on surface (14) of the mounting device which is identical to the screw-on surface of the scanning head. The guide channels are dimensioned in such a way that the mounting elements are at a distance A from each other. This distance A was selected so as to correspond to a small positive tolerance of the width of the measurement strip. Further, the position of the guide channels is so dimensioned that when the measurement strip is inserted into the contact channel formed by the two contact strips the position of the contact channel produces a positionally accurate correspondence of the measurement strip relative to the scanning head when the scanning head is fastened to the screw-on surface (14).

The mounting elements are advantageously provided by means of an adhesive foil which is covered by a protective foil. The mounting device also has a simple arrangement in the form of a diagonally arranged deflecting element (15) for pulling off the protective foils from the mounting elements and also contact pressure elements (16, 17) for pressing the mounting elements onto the receiving surface. Additional contact pressure forces assist and speed up the adhesion process. These contact pressure elements (16, 17) are constructed in the form of leaf springs made from commercially available spring steel. The contact pressure force can be adjusted via a cam or eccentric element (18) acting on the two leaf springs.

The individual steps of the method, according to the invention, for mounting the measurement strip on coordinate measuring machines will be described hereinafter. The first step consists in that the mounting device, instead of the scanning head, is loosely screwed onto the measurement carriage. The eccentric is brought into a position in which it relaxes the contact pressure springs. The mounting device is adjusted and tightly screwed at the correct distance from the receiving surface by placing a spacer template having a thickness of 0.2 mm between the mounting device and receiving surface. The two mounting elements are pushed through the guide channels of the mounting device from right to left until the intended position of the start of the measurement strip is reached. The mounting elements can be, for example, polished commercially available high-grade steel strip manufactured by Sandvik as Type 7C27Mo2 with high surface quality (micro-roughness <0.05 $\mu$m).

Figure 3A:
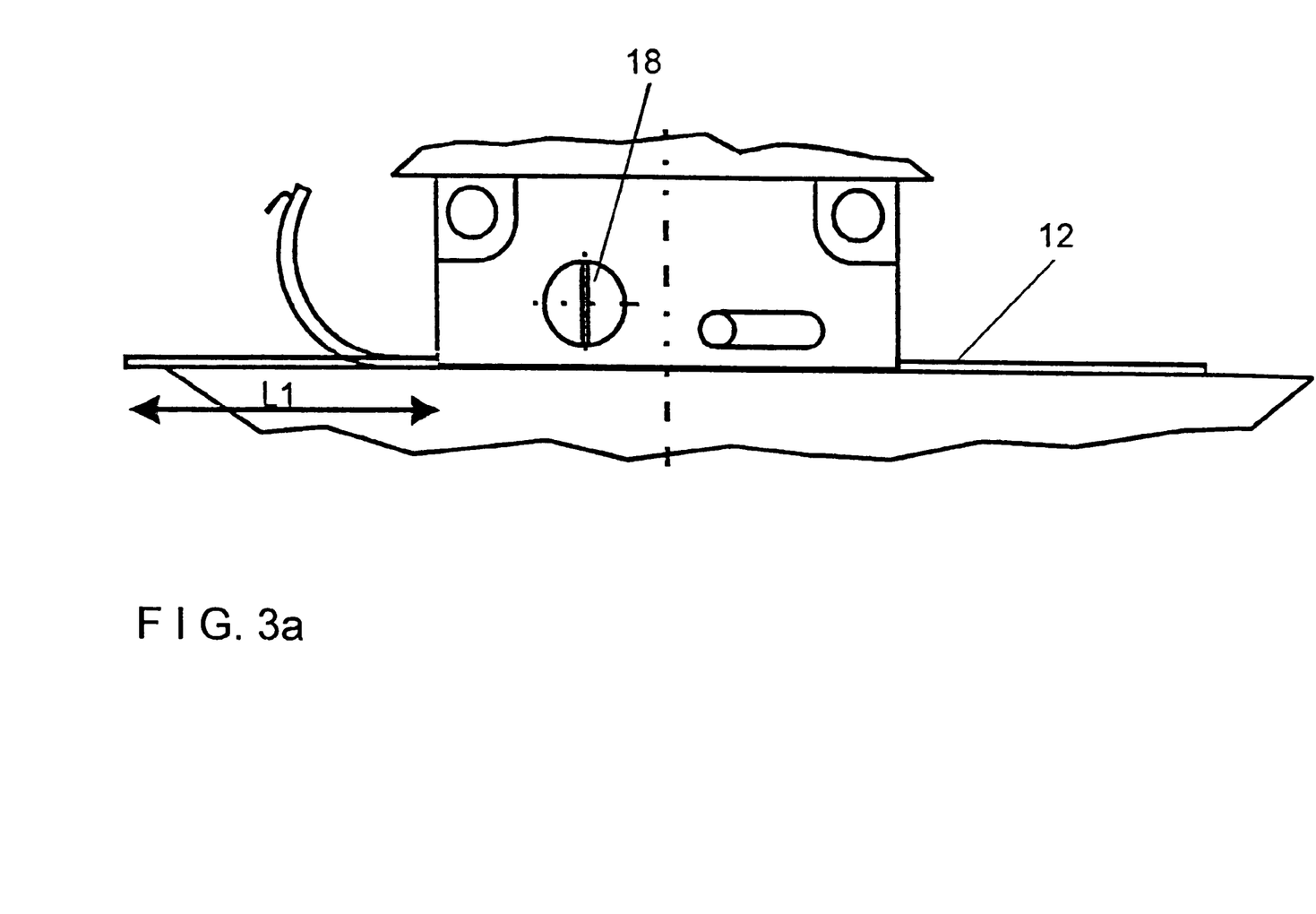
FIGS. 3a, 3b and 3c are schematic views showing the individual method steps.
Figures 3B, 3C:
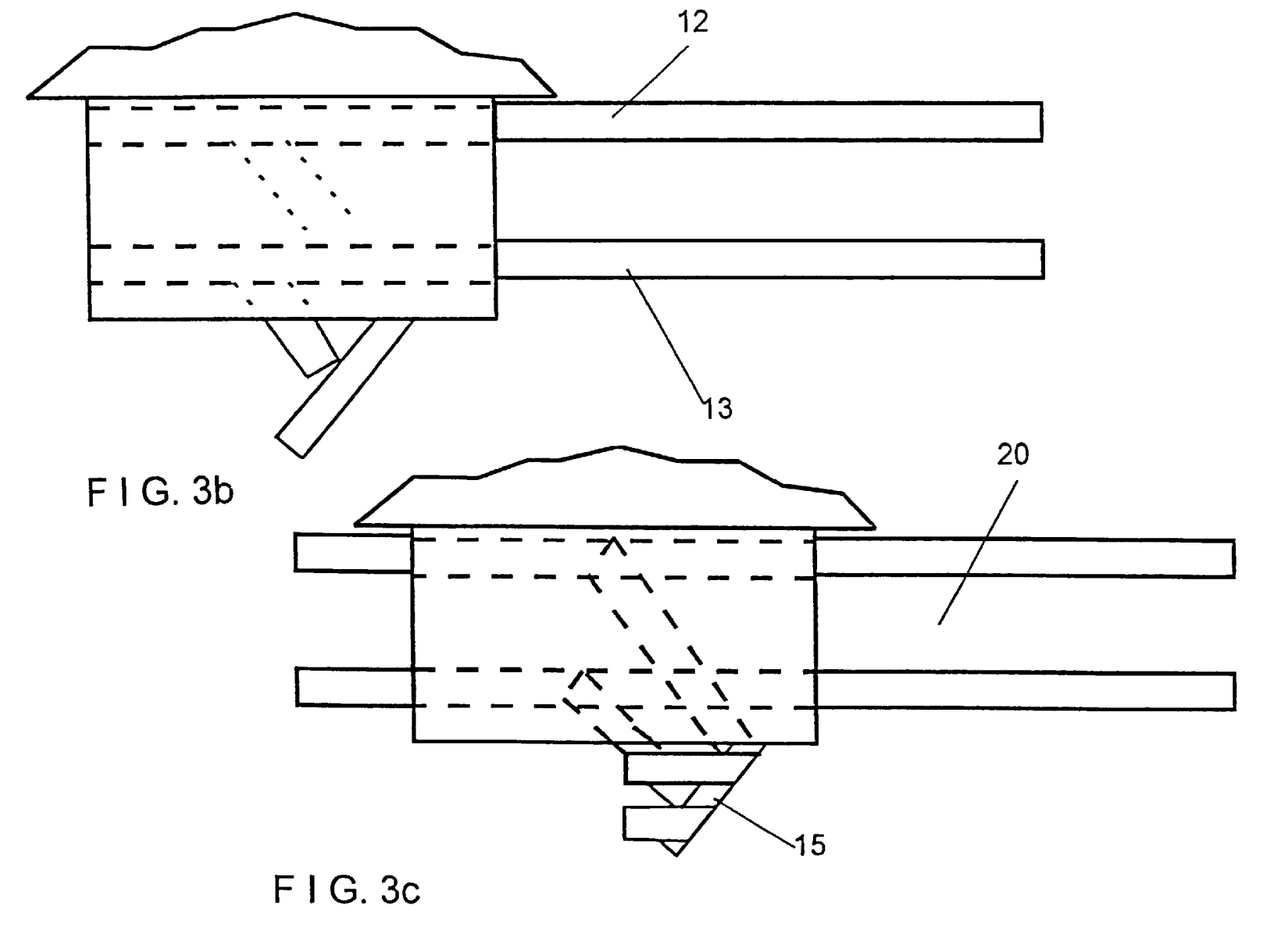

As is shown in FIG. 3a, the mounting device is moved up to measure L1 by approximately 100 mm into position L1. The mounting element (12) is then lifted up and the protective foil is pulled off by about 10 mm at the sides and laid on the receiving surface again. The same process is repeated with mounting element (13). The mounting device is then moved up to the start of the mounting elements as is shown in FIG. 3b. The mounting elements are accordingly exactly oriented with respect to their position—especially in the region of the pulled off protective foil. The mounting device is then displaced to the right until both protective foils can be folded around the sides of the deflecting element (15) so as to lie on the receiving surface as is shown in FIG. 3c. These protective foils must be pulled up around the deflecting element from below and fastened by about 10 mm to the receiving surface with an adhesive strip as is shown in FIG. 3c. The eccentric is then rotated into the contact pressure position, not shown in more detail, in order to exert a contact pressing force on the mounting elements.

In a next method step, the measurement carriage with the mounting device is moved gradually to the right over the entire area on which the measurement strip is to be mounted subsequently. In so doing, the protective foils are pulled off continuously from the receiving surface and the contact strips are glued on to the receiving surface in correct position. The protective foil can then be removed from the receiving surface and the mounting device can be unscrewed from the measurement carriage. The contact channel formed by the two mounting elements is aligned exactly with the course of the measurement carriage and its longitudinal extension accordingly conforms to the measurement direction.

In a further method step, the measurement strip is inserted into the contact channel. This can be carried out manually without additional devices and generally repeated as many times as necessary because the contact channel determines the alignment with the course of the measurement carriage. The measurement strip in the contact channel is advantageously fastened to the receiving surface by a relatively highly elastic adhesive tape. A commercially available adhesive tape manufactured by 3M under the trade name Scotch double-sided adhesive film No. 9485 can be used as adhesive tape. A lateral displacement of the measurement strip is prevented by the lateral mounting elements. Local stresses during the mounting of the scale are also well compensated for by the elastic adhesive tape.

In the final method step, the scanning head is screwed to the intended surface of the measurement carriage by means of a spacer template at the correct distance from the measurement strip.

This method for fastening the measurement strip is especially also advantageous for servicing because the measurement strip can be exchanged easily without additional mounting devices. The scanning head also need not be disassembled since the position correspondence of the measurement strip is retained in its entirety by means of the contact channel.

Figure 4:
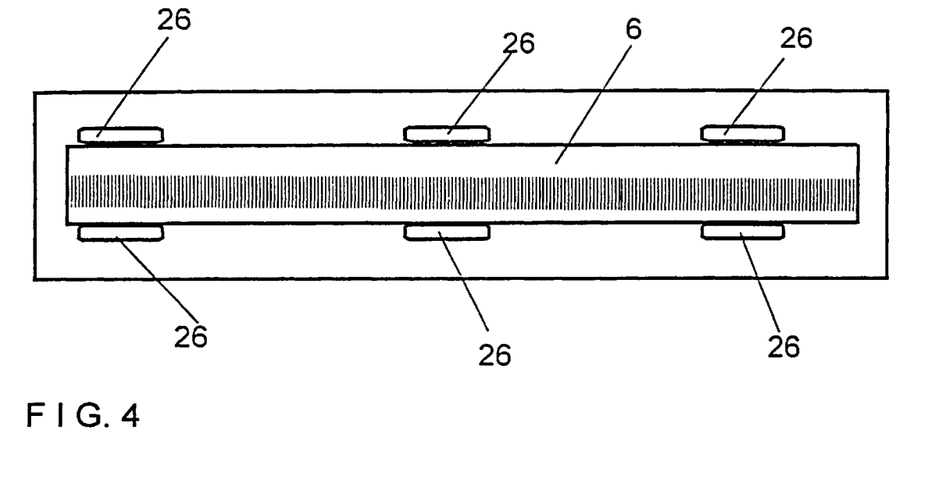
FIG. 4 is a top view of the measurement strip with discontinuous mounting elements.
Figure 5A:
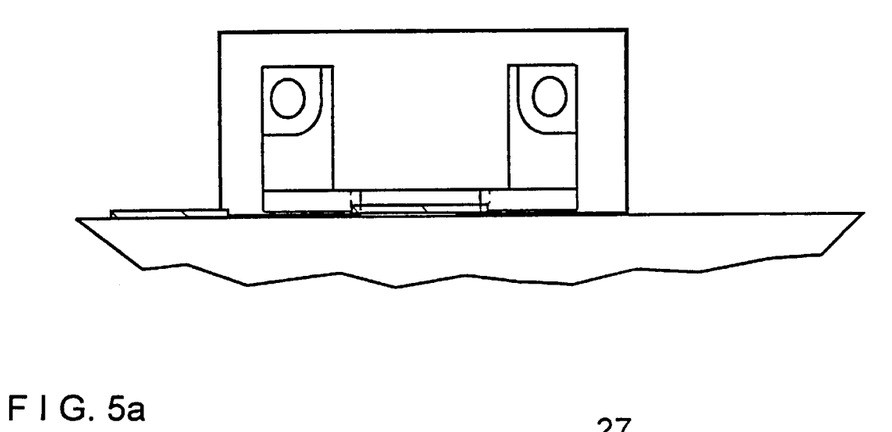
FIGS. 5a and 5b show schematic views of a mounting device for short mounting elements.
Figure 5B:
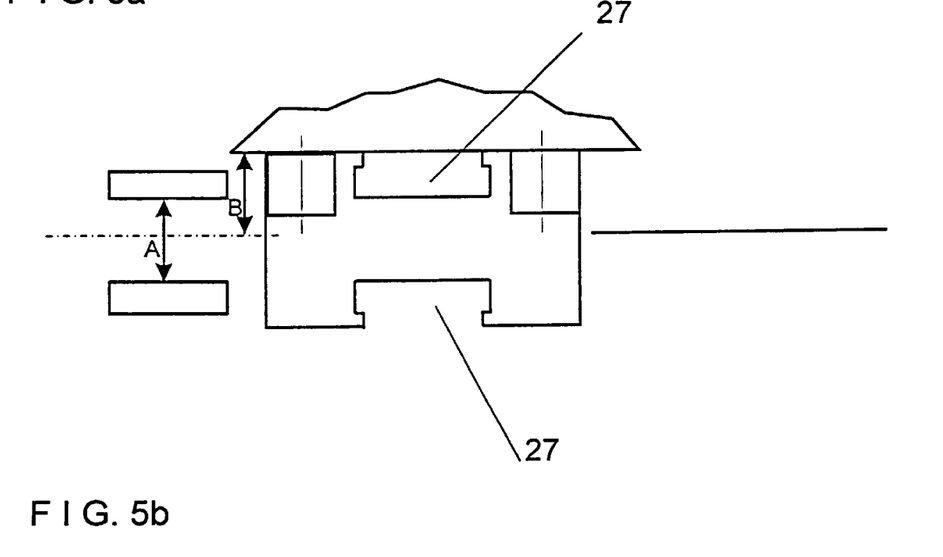

A further advantageous construction is shown in FIG. 4. In this embodiment example, individual short mounting elements (26) made from punched strip steel having a thickness of 0.5 mm and a length of 50 mm are used instead of continuous strips as mounting elements for the measurement strip. Fastening to the contact surface is again carried out by means of an adhesive foil by 3M, trade name: Scotch double-sided adhesive film No. 9485. In this case, also, in a first method step, a mounting device is used which is arranged on the measurement carriage. As is shown in Illustration 5, this mounting device has lateral guide profiles (27). After the height is adjusted relative to the receiving surface by a spacer template having a thickness of 0.2 mm, the mounting elements can be glued to optional locations while the measurement carriage remains stationary. These mounting elements are inserted into the guide profiles manually from above and are pressed onto the receiving surface. This mounting device is constructed in a simple manner and is easy to handle. This is primarily advantageous for measurement strip widths which are not manufactured in large quantities.

Figure 6:
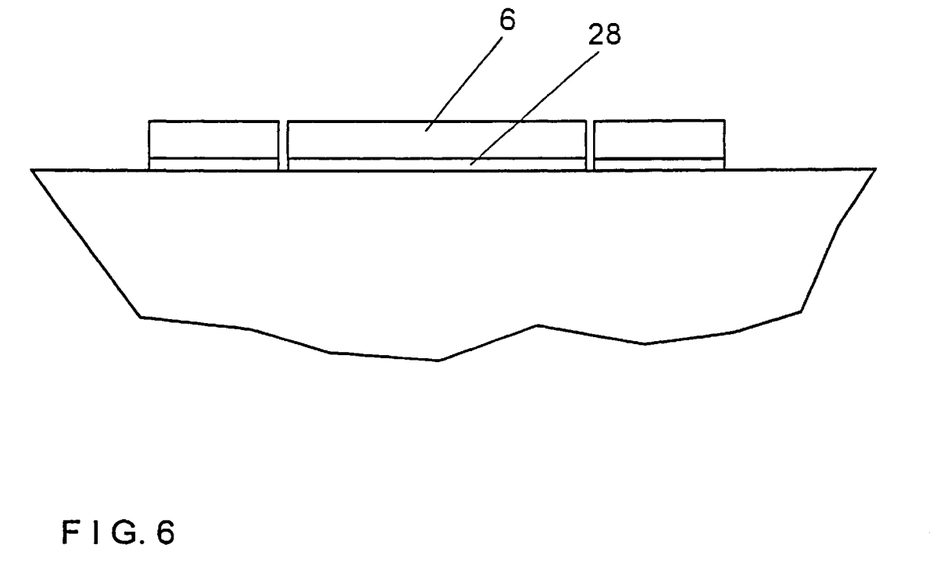
FIG. 6 shows a section (transverse to the longitudinal direction of the measurement strip) through the measurement strip holder.

FIG. 6 shows a cross section transverse to the longitudinal extension of the measurement strip. In this case, reference is had especially to advantageous fastening means (28) which are particularly benefitted by this method. For example, a highly viscous intermediate layer can be used for a particularly tension-free scale fastening. A high-viscosity silicone oil with a kinematic viscosity of 100,000 mm$^2$/s such as that manufactured by Wacker Chemie GmbH under the trade name "AK 100000" is especially suitable for this purpose.

For less demanding uses, a double-sided adhesive foil can also be used. This is particularly advantageous for premounting a measurement strip or when the measurement strip is changed often, since it can be removed from the measurement strip as well as from the receiving surface without leaving residue.

Figure 7A:
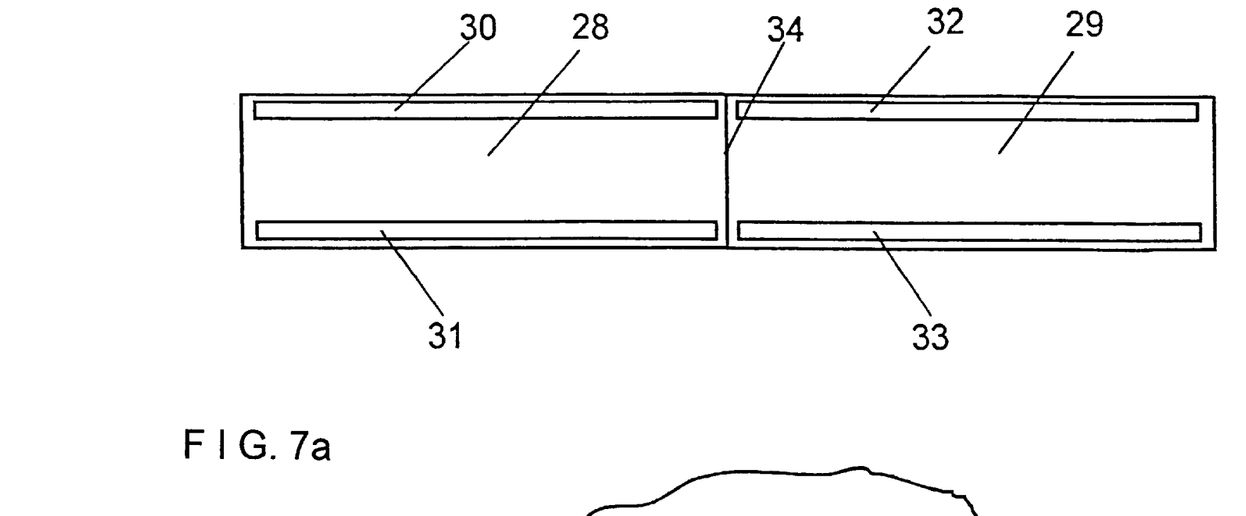
FIG. 7 shows a section (transverse to the longitudinal direction of the measurement strip) through the holding of the measurement strip by means of lateral mounting elements.
Figure 7B:
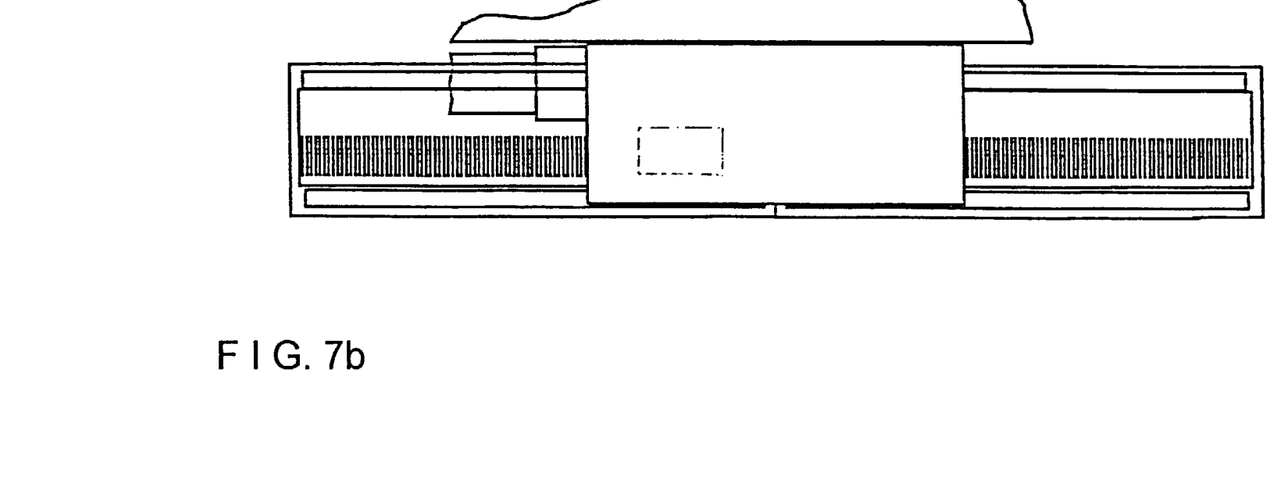
Figure 7C:
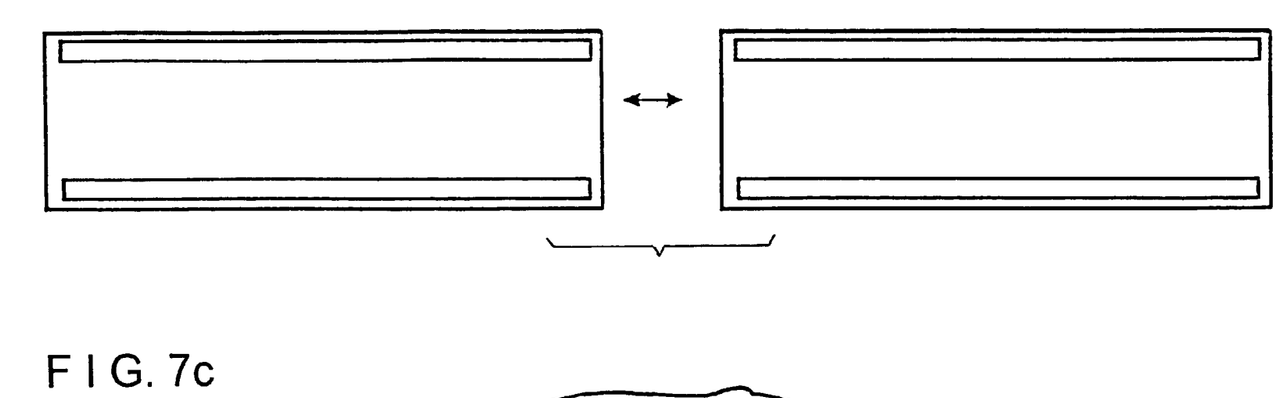

FIGS. 7a, 7b and 7c show special configurations of the method for large measurement strip lengths. The problems arising in the case of such long measurement strips which must be mounted via a plurality of mounting elements (28, 29) relate to the removability of the measurement strip and dependable pre-mounting. For this purpose, the method is modified in such a way that the contact strips (30, 31, 32, 33) are interrupted at the joining locations as is shown in FIG. 7a. These contact strips (30, 31, 32, 33) are accordingly associated with the individual mounting elements and remain in place during disassembly. After the mounting elements are mounted again in an accurate manner with respect to position, the contact channel is retained and a simple mounting of the measurement strip is possible after a conversion of the machine.

Figure 7D:
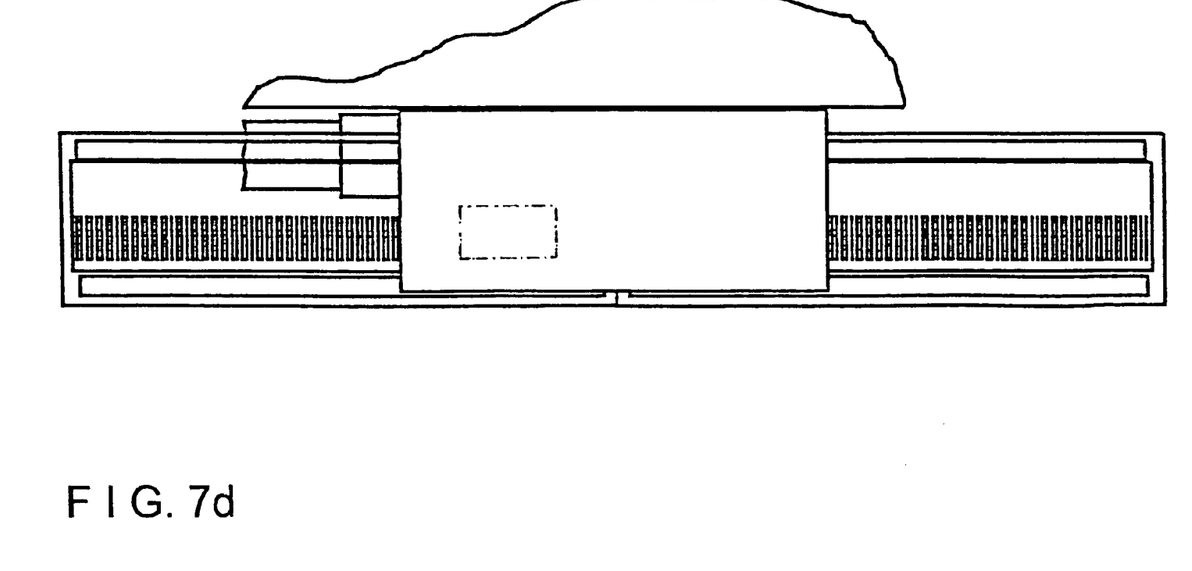

FIG. 7b shows the mounted mounting elements with the measurement strip inserted in the contact channel and with the correctly coordinated scanning head. FIG. 7c again shows the disassembled mounting elements with the associated contact strips. FIG. 7d shows the same measurement strip and scanning arrangement after the parts have been reassembled.

Figure 8:
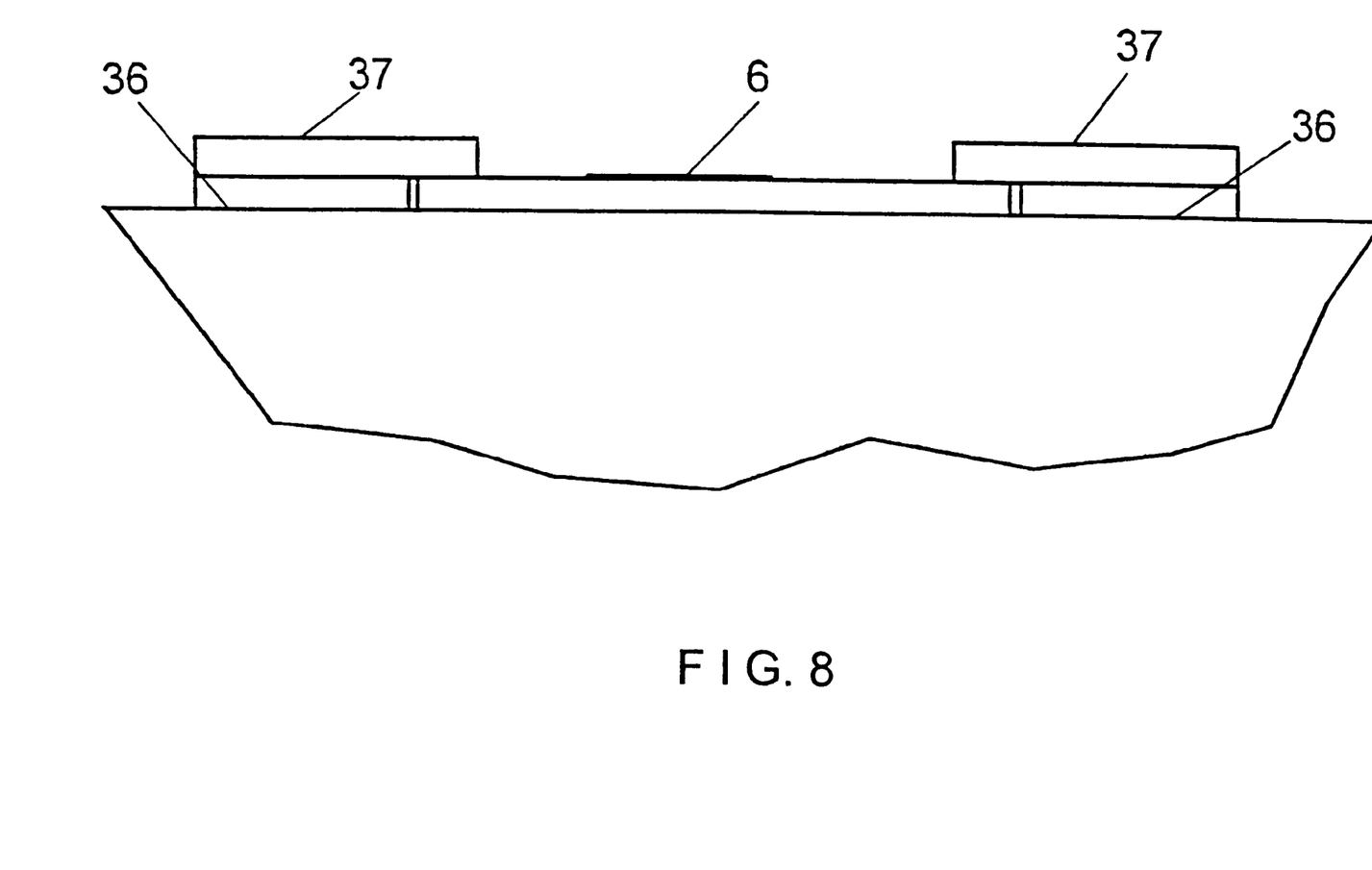
FIG. 8 are schematic top views of the mounting of the measurement strip showing the individual method steps for removable machine parts.

A further advantageous configuration of the method is shown in FIG. 8. The 250-μm thickness of the measurement strip is bridged by a double-sided adhesive tape (36) with a thickness of 300 μm. A spring steel strip (37) with a thickness of 100 μm is glued onto the upper side of the adhesive strip and projects out over the side of the measurement strip by 1 mm. Accordingly, a contact channel for the measurement strip is provided by the mounting elements, wherein the measurement strip can be pushed or pulled into the contact channel. Due to the lateral overlapping of the spring steel strip, the measurement strip is protected at the same time from lifting. It can stretch in a relatively tension-free manner in its longitudinal extension.

While the foregoing description and drawings represent the preferred embodiments of the present invention, it will be obvious to those skilled in the art that various changes and modifications may be made therein without departing from the true spirit and scope of the present invention.

What is claimed is:

1. A method for directed mounting of a measurement strip in a length measuring system comprising the steps of:

providing a first body at which the measurement strip is mounted and a second body which is displaceable relative to the first body;

arranging a mounting device at the movable second body;

fastening mounting elements by means of said mounting device in alignment with a movement path of the second body at the first body before the measurement strip is fastened to the first body; and mounting the measurement strip along said mounting elements.

2. The method according to claim 1, wherein the mounting elements are arranged in such a way that the measurement scale can be inserted therebetween in a positive engagement and so as to be retainable.

3. The method according to claim 1, wherein the mounting elements are at least one of being self-adhesive and being provided with a protective strip.

4. The method according to claim 3, wherein the protective strips of the mounting elements are pulled off before fastening to the receiving surface.

5. The method according to claim 1, wherein the measurement strip is glued in between the mounting elements.

6. The method according to claim 1, wherein the measurement strip is fastened by an adhesive foil.

7. The method according to claim 1, wherein the measurement strip is fastened by means of a viscous adhesive film.

8. The method according to claim 1, wherein the mounting elements are individual partial mounting elements arranged one after another in the moving path of the second body and the individual mounting elements are arranged in one method step, and wherein the individual mounting elements are interrupted at least at joint locations of the partial mounting elements and wherein the measurement step is mounted along the mounting elements in a continuous manner after mounting of the individual partial mounting elements.

9. A device for directed mounting of a measurement strip of a length measuring system on a first body, comprising:

a second body which is displaceable relative to the first body;

a mounting device at the movable second body; and mounting elements on the first body which are fastened by the mounting device in alignment with a movement path of the second body, whereby the measuring strip is to align by the fastened mounting elements.

10. The mounting device according to claim 9, wherein the mounting elements have guide channels for guiding the measuring strip.

11. The mounting device according to claim 9, wherein means are provided for applying contact pressure to the mounting elements.

12. The device according to claim 9, wherein said mounting elements have adhesive protective foils and wherein means are provided for pulling off adhesive protective foils of the mounting elements.

* * * * *